United States Patent [19]

Adlerborn et al.

[11] Patent Number: 4,568,516
[45] Date of Patent: Feb. 4, 1986

[54] METHOD OF MANUFACTURING AN OBJECT OF A POWDERED MATERIAL BY ISOSTATIC PRESSING

[75] Inventors: Jan Adlerborn; Hans Larker; Jan Nilsson; Bertil Mattsson, all of Robertsfors, Sweden

[73] Assignee: ASEA Aktiebolag, Västerås, Sweden

[21] Appl. No.: 577,805

[22] Filed: Feb. 7, 1984

[30] Foreign Application Priority Data

Feb. 8, 1983 [SE] Sweden ................................ 8300645

[51] Int. Cl.⁴ .............................................. B22F 3/00
[52] U.S. Cl. ........................................ 419/26; 419/23;
419/31; 419/35; 419/39; 419/42; 419/44;
419/45; 419/49; 419/54; 419/55; 419/57;
419/68; 29/156.8 B; 29/23.5; 75/228; 75/244;
264/62; 264/332; 416/241 R; 416/241 B;
428/698; 428/704; 501/96
[58] Field of Search ............ 419/26, 39, 23, 42,
419/31, 49, 35, 44, 45, 54, 55, 59, 68; 29/156.8,
23.5; 75/228, 244; 264/62, 332; 416/241 R, 241
B; 428/698, 704; 501/96

[56] References Cited

U.S. PATENT DOCUMENTS

| 4,081,272 | 3/1978 | Adlerborn | 419/49 |
| 4,478,789 | 10/1984 | Adlerborn et al. | 419/49 |
| 4,499,048 | 2/1985 | Hanejko | 419/49 |

Primary Examiner—Stephen J. Lechert, Jr.
Attorney, Agent, or Firm—Watson, Cole, Grindle & Watson

[57] ABSTRACT

An object is manufactured from a powdered material by isostatic pressing of a body, preformed from the powdered material, with a pressure medium, whereby the preformed body, in which at least the surface layer consists of a ceramic material in the form of a nitride, is surrounded by a casing which is rendered impenetrable to the pressure medium, before the isostatic pressing is carried out and the powder sintered. As the material in the casing there is used boron oxide or a glass containing boron oxide or a material forming glass while being heated, in which the content of boron oxide is sufficiently high for the glass—or the glass formed during heating—to be removable by water. The preformed body surrounded by the casing is subjected to a heat treatment for the formation of boron nitride on the surface of the preformed body, before the isostatic pressing is carried out. The casing is removed from the finished product by means of water or water vapor.

7 Claims, 3 Drawing Figures

METHOD OF MANUFACTURING AN OBJECT OF A POWDERED MATERIAL BY ISOSTATIC PRESSING

BACKGROUND OF THE INVENTION

1. Field of the Invention

The present invention relates to a method of manufacturing an object of a powdered material by isostatic pressing of a body preformed from the powdered material.

2. The Prior Art

When the preformed powder body is subjected to the isostatic pressing at the sintering temperature in order to provide a desired dense, sintered product, the body is enclosed in a casing which, during the pressing, may prevent the pressure medium used in that connection, normally a gas, from penetrating into the powder body. The casing as well as its contents are normally freed from undesirable gases during some process stage prior to the sealing. Different ways of forming the casing are known. According to one known method, a preformed capsule of glass is used as casing. According to another known method, the casing is manufactured on the spot by dipping the preformed powder body into a suspension of particles of glass, or in some other way surrounding it with a layer of particles of such glass and then heating it under vacuum at such a temperature that the particles form a dense casing around it. Possibly, two such layers of glass having different melting points are used.

Canadian Pat. No. 1,148,772 describes one method of manufacturing a dense casing in the form of a melt of glass according to which the preformed powder body embedded in a compound of glass particles is placed in a heat-resistant vessel and the compound is transformed into a melt, below the surface of which the preformed body is located when a pressure necessary for the isostatic pressing is applied on the melt by means of a gas.

The above-mentioned Canadian patent mentions a glass containing boron oxide as a suitable material for achieving a casing for a preformed body of silicon nitride since, when using such glass, it has been found to be possible to avoid a penetration of molten glass into a preformed body of silicon nitride. As a probable explanation of the fact that boron-containing glass does not penetrate into the silicon nitride body, there is mentioned the formation of a boron-nitrogen compound, probably boron nitride, in the boundary surface between the glass and the silicon nitride, before the glass forms a low-viscous melt, and that this boron nitrogen compound counteracts the penetration of the glass into the pores of the powder body. The content of $B_2O_3$ in the glass is stated to amount to between 2 percent by weight and 70 percent by weight.

After the isostatic pressing, the finished object, after having been allowed to cool, is embedded in the used casing of glass which has then solidified. The casing normally has to be removed by blasting in order for the object not to be damaged during removal. In certain cases it may be possible to remove the main portion of the casing by heating it to a temperature at which the glass becomes sufficiently thinly fluid to run off and only leave a thin film which is removed by blasting. Also pickling may be used. The removal of the casing is time-consuming and—particularly in case of objects having complicated shape—an extremely troublesome operation.

SUMMARY OF THE PRESENT INVENTION

According to the present invention it has been found to be possible to provide a casing which can be removed from the object manufactured during the isostatic pressing by considerably simpler means than what has been possible with hitherto used casings. More particularly, the present invention permits the removal of the casing by using water or water vapour, and in such cases where a casing can be removed partially by melting it and allowing it to run off, the casing can be removed at considerably lower temperatures than what has hitherto been possible, which increases the possibility of employing this method.

The present invention relates to a method of manufacturing an object of a powdered material by isostatic pressing of a body, preformed from the powdered material, with a pressure medium, whereby the preformed body, in which at least the surface layer consists of a ceramic material in the form of a nitride, is provided with a boron oxide-containing casing which is made impenetrable to the pressure medium, before the isostatic pressing is carried out while simultaneously sintering the powder, characterized in that, as material in the casing, there is used boron oxide or a boron oxide-containing glass or boron oxide-containing material-forming glass during heating, in which the boron oxide content is sufficiently high for the glass—or the glass formed during heating—to be removable with water, that the preformed body surrounded with the casing is subjected to a heat treatment for the formation of boron nitride on the surface of the preformed body by reaction between the nitride in the surface layer of the preformed body and the boron oxide in the casing, before the isostatic pressing is carried out, and that at least that part of the casing of boron oxide or boron oxide containing glass which is located nearest the finished object is removed by water or water vapour.

The material for the casing may consist of pure boron oxide. If it consists of a boron oxide-containing glass or of a material forming glass during heating, the content of boron oxide preferably amounts to at least 30 percent by weight, and preferably at least 50 percent by weight.

As examples of glass or glass-forming materials may be mentioned mixtures of $B_2O_3$ and other oxides, such as alkaline metal oxides, alkaline earth metal oxides and rare earths metal oxides (lanthanide oxides), $SiO_2$, $GeO_2$, $Y_2O_3$ and $Al_2O_3$. The viscosity of the glass or of the glass formed upon heating suitably amounts to at most $10^4$ poises at a temperature of about 1000° C., since this facilitates a removal of the casing partially by melting it and allowing it to run off the finished object.

The heat treatment for ensuring the formation of boron nitride on the surface of the preformed body by reaction between the nitride of ceramic material in the surface layer of the preformed body and the boron oxide in the casing is carried out at a temperature of at least 900° C., preferably at least 1100° C.

The powdered material preferably constitutes a ceramic material or a metallic material. As examples of ceramic materials to which the present invention is applicable may be mentioned nitrides such as silicon nitride, silicon aluminium oxide nitride, aluminium nitride, titanium nitride, zirconium nitride, metal oxides such as aluminium oxide, zirconium oxide, both fully and partially stabilized, magnesium oxide, carbides such as silicon carbide, titanium carbide, borides such as titanium boride, zirconium boride, and mixtures of such materials.

As examples of metallic materials may be mentioned, among other things, steel, iron-based alloys, for example, 3% Cr-Mo steel containing 0.33% C, 0.30% Si, 0.40% Mn, 0.01% P, 0.01% S, 2.8% Cr, 0.6% Mo, the balance being Fe, or 12% Cr-Mo-V-Nb steel containing 0.18% C, 0.25% Si, 0.60% Mn, 0.01% P, 0.01% S, 11.5% Cr, 0.5% Ni, 0.5% Mo, 0.30% V, 0.25% Nb, the balance being Fe, or an alloy containing 1.27% C, 0.3% Si, 0.3% Mn, 6.4% W, 5.0% Mo. 3.1% V, 4.2% Cr, the balance being Fe, or a nickel-based alloy, for example an alloy containing 0.03% C, 15% Cr, 17% Co, 5% Mo, 3.5% Ti, 4.4% Al, 0.03% B, the balance being Ni, or an alloy containing 0.06% C, 12% Cr, 17% Co, 3% Mo, 0.06% Zr, 4.7% Ti, 5.3% Al, 0.014% B, 1.0% V, the balance being Ni. In this paragraph and in the following text, the percentage relates to percentage by weight.

The present invention is also applicable to composite products with at least some part manufactured from powdered starting material.

If the powdered material from which the preformed body is manufactured consists of a metallic material or of another ceramic material than a nitride, according to the invention the material is provided with a surface layer of a nitride, for example silicon nitride, chromium nitride or aluminium nitride. This can be achieved by dipping the preformed body in or spraying it with a suspension of silicon nitride or other nitride in alcohol, possibly with a binder, for example isopropanol with 100 g/l butyl acrylate, followed by a drying of the preformed body.

According to a preferred embodiment of the invention, the manufacture of the object of the powdered material is performed in such a way that the preformed body with the surrounding casing of boron oxide or boron oxide-containing glass is placed in an open vessel, which is resistant to the temperature at which the sintering of the powdered material is carried out, and the casing is made impenetrable to the pressure medium by transforming the casing into a melt with a surface limited by the walls of the vessel, below which surface the preformed body is located when a pressure necessary for the isostatic pressing is applied to the melt by the pressure medium. To enable the formation of a boron nitrogen compound on the surface of the powder body and thereby avoid penetration of the casing into the powder body, it is heated to a temperature of at least 900° C., preferably of at least 1100° C., before a pressure necessary for the isostatic pressing is applied on the melt. The pressure medium is preferably a gas. According to this embodiment, the melt can be given arbitrarily low viscosity and a high pressure can be used during the isostatic pressing with no risk of damage arising on the preformed body—a risk which is particularly great if the body has thin and weak portion.

The pressure and the temperature for the isostatic pressing and the sintering of a ceramic or metallic material are, of course, dependent on the type of this material. Normally, however, the pressure should amount to at least 100 MPa and the temperature to at least 1000° C.

The invention will be described in greater detail by reference to the accompanying drawings.

DETAILED DESCRIPTION OF THE PREFERRED EMBODIMENTS

Silicon nitride powder with a powder grain size of less than 5 μm and containing about 0.5 percent by weight free silicon and about 1 percent by weight yttrium oxide is placed in a capsule of plastic, for example plasticized polyvinyl chloride, or of rubber, having approximately the same shape as the preformed powder body to be manufactured, whereafter the capsule is sealed and subjected to a compaction at a pressure of 600 MPa for a period of 5 minutes. After completed compaction the capsule is removed and the preformed powder body thus manufactured is machined into the desired shape. The powder body has a density of about 60% of the theoretical density.

Figure 1:
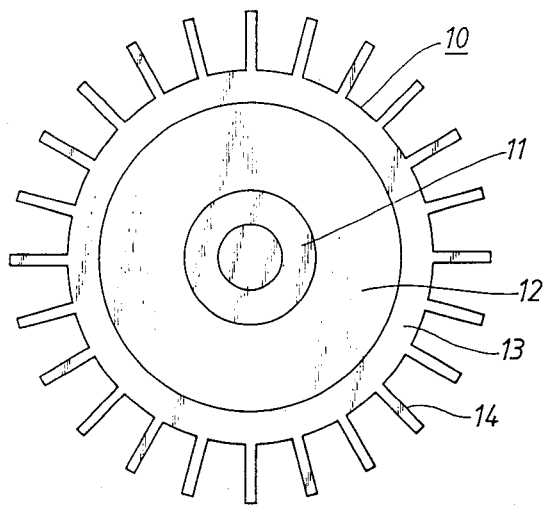
FIG. 1 shows a body, preformed from the powdered material, in the form of a turbine wheel for a gas turbine seen from above.
Figure 2:
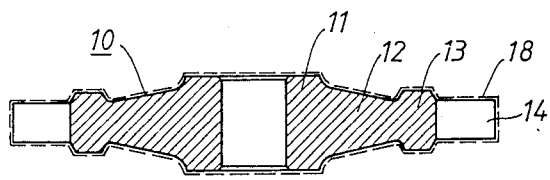
FIG. 2 shows the same body in axial cross-section.

The preformed powder body 10, which is shown in FIGS. 1 and 2, consists of a turbine wheel with hub 11, web 12, rim 13 and blades 14.

Figure 3:
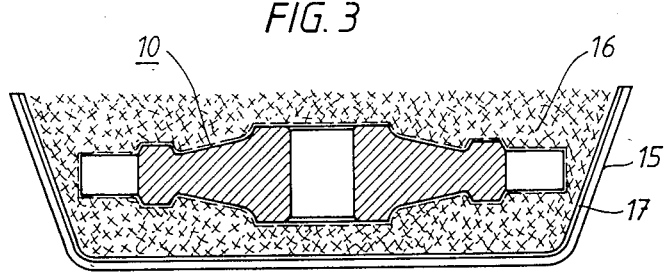
FIG. 3 shows the body placed in a temperature resistant vessel and embedded in a compound of particles of the material which is to form a casing impenetrable to the pressure medium.

As will be clear from FIG. 3, the powder body is placed in an open-topped vessel 15, which is resistant to the sintering temperature used, and is embedded in a powder 16 of pure boron oxide. In the exemplified case the vessel consists of graphite and is internally provided with a release layer 17 of boron nitride. If the bottom of the vessel is not gas-tight, a plate of gas-tight graphite, gas-tight boron nitride or molybdenum foil is applied in its bottom before the release layer 17 is applied. The casing around the preformed product is thus formed in this case by particles of boron oxide.

One or more vessels 15 are placed in a high-pressure furnace of a known type which is provided with a conduit through which gas may be led for degassing the vessel with its contents, and gas, suitably argon, helium or nitrogen gas, may be supplied for generating a necessary pressure for the isostatic pressing, and which is provided with means for heating the furnace. In a high pressure furnace the preformed body 10 with the surrounding powder 16 of boron oxide is first degassed for approximately 2 hours. During continued evacuation the temperature is increased to approximately 600° C. The temperature increase is made so slowly that the pressure does not exceed 0.1 torr during any part of the time. At approximately 600° C., the temperature is held constant for approximately one hour, whereby the final degassing takes place and the boron oxide powder forms a melt with low viscosity which completely surrounds the powder body 10. After this, argon, helium or nitrogen gas is supplied so that the pressure is 0.1 MPa and the temperature is increased to 1150° C. and is maintained at this temperature for one hour. After this treatment a surface layer of boron nitride has been formed on the preformed body. At the same temperature there is then supplied argon, helium or nitrogen gas to a pressure level which gives a pressure of 200–300 MPa at the final sintering temperature. The temperature is then raised to 1700°–1800° C., that is, to a suitable sintering temperature for the silicon nitride for a period of one hour. The pressure then rises simultaneously. A suitable time for sintering under the conditions stated is at least two hours. After a completed cycle the furnace is allowed to cool to a suitable discharging temperature. The vessel 15 then contains a blank cake, in which the powder body is visible through the solidified and limpid boron oxide. The powder body is completely embedded in the boron oxide and has thus, during the pressing, been situated in its entirety below the surface of the melt. Due to the fact that it has been possible to apply the high pressure necessary for the pressing when the melt has been low-viscous, faultless objects can be manufactured with good reproducibility. The cake is easily released from the vessel because of the presence of the release layer 17. The casing of boron oxide can be removed by leaching by hot water, to which possibly NaOH or another alcalic compound is added, or by spraying with water vapour. The leaching by water may alternatively be carried out in an autoclave at a raised temperature. Alternatively, the casing is removed partially by heating the cake to about 600° C. so that part of the boron oxide runs off the finished object and leaves a film of boron oxide thereof. This film may be removed from the object by water or water vapour, as stated above. Part of the boron oxide may alternatively be removed during cooling of the finished object while the melt still has a sufficiently low viscosity.

In an alternative embodiment, there is used a glass containing 90 percent by weight $B_2O_3$, 5 percent by weight $SiO_2$, 4 percent by weight MgO and 1 percent by weight $Al_2O_3$. Since this glass has a higher melting point than that of the above-mentioned example, the final degassing is performed at 900° C. Otherwise, the same conditions are used as in the above example.

The same procedure as described above for the manufacture of a turbine wheel of silicon nitride is used in modified form for the manufacture of a turbine wheel of silicon carbide. In this case the preformed body is coated with a surface layer 18 of silicon nitride before it is placed in the vessel 15. For the application of the surface layer there may be used a suspension of silicon nitride with a grain size lower than 5 $\mu$m in isopropanole with 100 g/l butyl acrylate with a gruel-like consistency. After drying the coating has a thickness of about 0.2 mm. The silicon nitride layer is efficiently anchored to the preformed body and forms boron nitride at the contact surface with boron oxide during the heat treatment to which the preformed body is subjected in the vessel 15 prior to the isostatic pressing. The isostatic pressing is carried out at a temperature of 1900°-2000° C. Otherwise, the same conditions can be used as have been described above for silicon nitride.

The same procedure as described above for the manufacture of a turbine wheel of silicon carbide is used in modified form for the manufacture of a turbine wheel of a 12% Cr-Mo-V-NB steel containing 0.18% C, 0.25% Si, 0.60% Mn, 0.01% P, 0.01% S, 11.5% Cr, 0.5% Ni, 0.5% Mo, 0.30% V, 0.25% Nb, the balance being Fe, and with a grain size of less than 800 $\mu$m. The preformed body is provided in the same way as described for the turbine wheel of silicon carbide with a surface layer of chromium nitride. In this case the heat treatment for the formation of boron nitride is carried out at 1000° C. for one hour and the isostatic pressing at a temperature of 1200° C. Otherwise the same conditions can be used as described above for silicon carbide.

The same procedure as described above the the manufacture of a turbine wheel of silicon carbide is used in modified form for the manufacture of a cutter of powder of an iron-based alloy of the following composition: 1.27% C, 0.3% Si, 0.3% Mn, 6.4% W, 5.0% Mo, 3.1% V, 4.2% Cr, the balance being Fe, and having a grain size of less than 600 $\mu$m. The preformed body is provided in the same way as described for the turbine wheel of silicon carbide with a surface layer of aluminium nitride. In this case both the heat treatment for the formation of boron nitride and the isostatic pressing are carried out at a temperature of 1150° C. Otherwise, the same conditions can be used as described above for silicon carbide.

The same procedure as described above for the manufacture of a turbine wheel of silicon nitride is used in modified form for the manufacture of an electric bushing with ceramic insulation. A cylindrical electrode of a nickel-based alloy with the composition 28% Mo, 5% Fe, the balance being Ni, is used as a core during cold isostatic pressing of a concentric casing of a ceramic powder. The powder consists of a zirconium oxide with 4.5% yttrium oxide and has a grain size of less than 5 $\mu$m. The pressed body is formed and the ends of the electrodes are freed from ceramic material by machining. The composite body is provided, in the same way as described for the turbine wheel of silicon carbide, with a surface layer of silicon nitride. In this case both the heat treatment for the formation of boron nitride and the isostatic pressing are carried out at a temperature of 1200° C. Otherwise, the same conditions can be used as described above for silicon carbide.

We claim:

1. A method of manufacturing an object of a powdered material by isostatic pressing of a body, preformed from the powdered material, with a pressure medium, whereby the preformed body, in which at least the surface layer consists of a ceramic material in the form of a nitride, is surrounded by a boron oxide-containing casing which is made impenetrable to the pressure medium, before the isostatic pressing is carried out while sintering the powder, wherein for the material in the casing there is used boron oxide, or a glass containing boron oxide or a material containing boron oxide which forms glass upon heating and in which the content of boron oxide is at least 30% by weight such that the glass, or the glass formed upon heating, is removable by water, that the preformed body surrounded by a casing is subjected to a heat treatment for the formation of boron nitride on the surface of the preformed body and the boron oxide in the casing, before the isostatic pressing is carried out, and that at least that part of the casing which is located nearest the manufactured object is removed by water or water vapour.

2. Method according to claim 1, wherein the boron oxide content in the glass or in the material forming glass upon heating amounts to at least 50 percent by weight.

3. Method according to claim 1, wherein the heat treatment for the formation of boron nitride on the surface of the preformed body is carried out at a temperature of at least 900° C.

4. Method according to claim 1, wherein the material in the casing has a viscosity of at most $10^4$ poises at a temperature of 1000° C.

5. Method according to claim 1, wherein the preformed body consists of silicon nitride or of a material built up with silicon nitride as the main constituent.

6. Method according to claim 1, wherein the preformed body consists of a ceramic or a metallic material provided with a coating in the form of a nitride.

7. Method according to claim 1, wherein the preformed body and the casing, when the casing is made impenetrable to the pressure medium, is placed in an open vessel which is resistant to the temperature at which the sintering of the powdered material is carried out, and that the casing is transformed into a melt with a surface limited by the walls of the vessel, below which the preformed body is located when the isostatic pressing is carried out.

* * * * *